Figure 1:
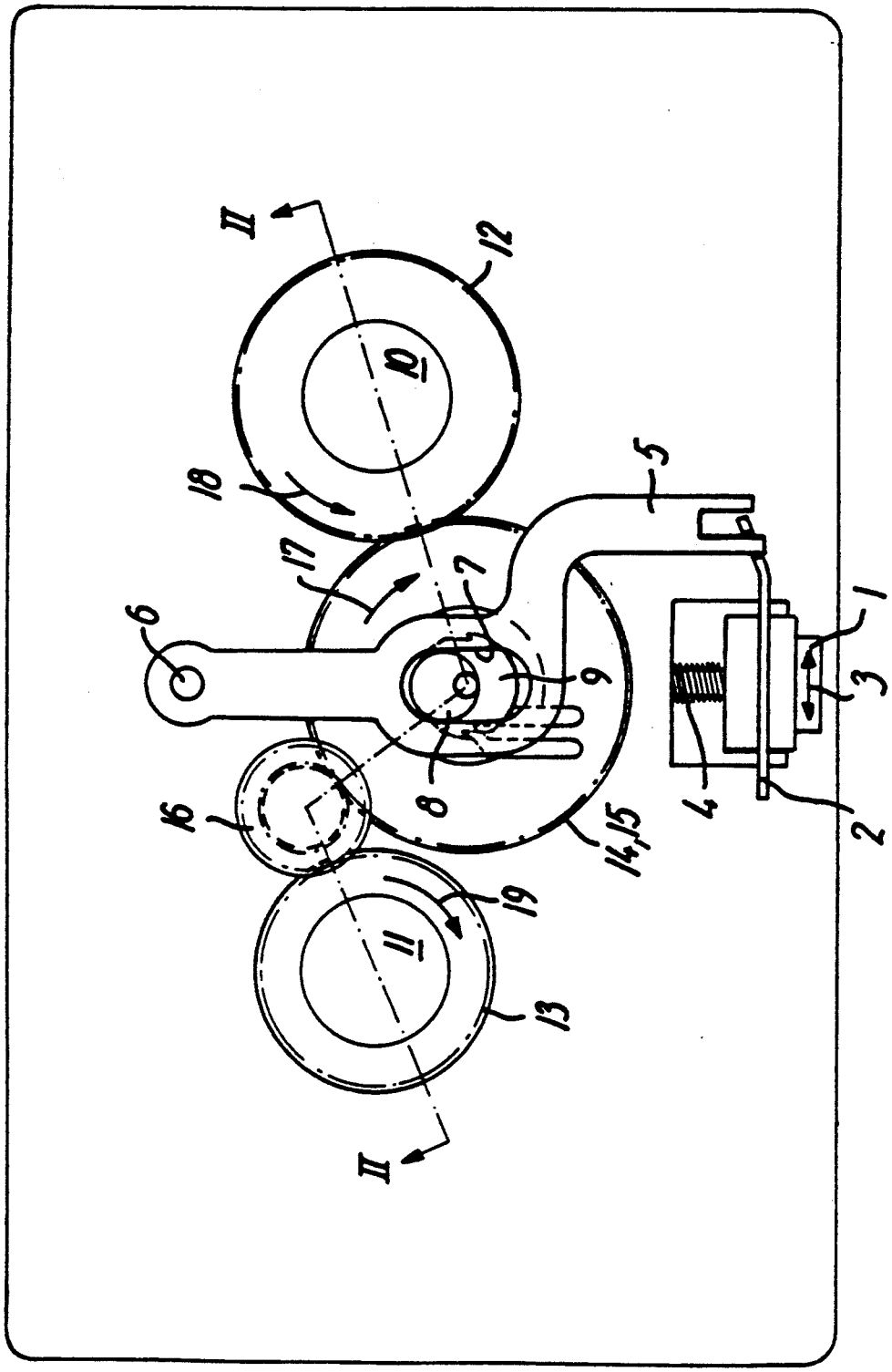

United States Patent [19]

Moesgaard et al.

[11] Patent Number: 5,243,484
[45] Date of Patent: Sep. 7, 1993

[54] CLEANING CASSETTE FOR CASSETTE TAPE RECORDERS

[75] Inventors: Anders Moesgaard, Klampenborg; Helge Moller, Charlottenlund, both of Denmark

[73] Assignee: Am Kemi A/S, Kokkedal, Denmark

[21] Appl. No.: 634,135

[22] PCT Filed: Jul. 4, 1989

[86] PCT No.: PCT/DK89/00167
§ 371 Date: Jan. 7, 1991
§ 102(e) Date: Jan. 7, 1991

[87] PCT Pub. No.: WO90/00795
PCT Pub. Date: Jan. 25, 1990

[30] Foreign Application Priority Data

Jul. 8, 1988 [DK] Denmark ............................ 3820/88

[51] Int. Cl.⁵ ................................................ G11B 5/41
[52] U.S. Cl. ...................................... 360/128; 360/137
[58] Field of Search ............................. 360/128, 137

[56] References Cited

U.S. PATENT DOCUMENTS 4,272,796 6/1981 Van Kreuningen et al. ........ 360/128
4,594,629 6/1986 d'Arc .................................. 360/128

FOREIGN PATENT DOCUMENTS 151656 12/1987 Denmark .
0114115 7/1984 European Pat. Off. .
0309398 3/1989 European Pat. Off. ............ 360/128
3311231 9/1985 Fed. Rep. of Germany .
2173033 10/1986 United Kingdom ................ 360/128

Primary Examiner—John H. Wolff
Attorney, Agent, or Firm—Burns, Doane, Swecker & Mathis

[57] ABSTRACT

A cleaning cassette for cassette tape recorders comprises a cleaning member which engages the recording-/reproducing head of the tape recorder upon placing the cassette in the recorder. Through a first and second transmission device the cleaning member is connected with an operative coil drive shaft in the tape recorder to impart to the cleaning member by the rotation of the coil drive shaft a reciprocating sweeping movement across the recording head. The first and second transmission devices each include a one-way coupling device connected with a common shaft pin carrying an eccentric head engaging a slot in a pivot arm whose free end is connected with the cleaning member. Each of the transmissions provides for a correct cleaning function irrespective of which of the two transmissions is connected with the operative coil drive shaft without establishing drive connection with the other transmission.

4 Claims, 2 Drawing Sheets

CLEANING CASSETTE FOR CASSETTE TAPE RECORDERS

The present invention relates to a cleaning cassette for cassette tape recorders comprising a cleaning member which upon placing the cassette in the tape recorder is brought into engagement with its recording/reproducing head and which is subjected to a reciprocating cleaning movement across the recording head by means of a pivot arm, one end of which is pivotal about a stationary axis while the other end is connected with the cleaning member, said pivot arm having a slot engaging an eccentric head connected through a transmission device with hub means for engagement with respective ones of the coil drive shafts of the tape recorder in such a manner that the cleaning member by rotation of an arbitrary one of the coil drive shafts of the tape recorder is subjected to said cleaning movement.

From DK patent No. 151,656 such a cleaning cassette is known in which the cleaning member is connected to both coil drives of the cassette by means of a gear-wheel arrangement including pinions communicating with respective coil drives and engaging an idle wheel connected with an eccentric cam device actuating a pivot arm with which the cleaning member is connected.

This design provides for obtaining a correct cleaning function irrespective of the orientation of the cleaning cassette when positioned in the tape recorder, but the transmission device suffers from the drawback that it establishes a direct driving connection from the first hub means to the second hub means of the cassette, thereby causing the motor of the tape recorder to perform, through the active coil drive shaft, not only the necessary motive power for the cleaning cassette but also a sufficient motive power for the indispensable co-rotation of the second coil drive shaft of the tape recorder and the transmission devices connected therewith.

In a device disclosed in EP patent No. 0,144,364 this drawback has been eliminated in that the reciprocating movement of the cleaning member is provided by means of a spring-biassed pivot arm actuated by a cam device connected with one of the hub means, while a second pivot arm is positioned between a holder for the cleaning member and a cam device connected with the second hub means in such a manner that the second pivot arm which is not directly connected with the holder of the cleaning member by engagement between the second hub means and the effective coil drive shaft of the tape recorder may impart a forward movement to the cleaning member against the spring bias force exerted on the first pivot arm, while the return movement is solely effected by the spring bias force.

Thereby a direct drive connection from the first to the second hub means of the cassette is avoided, but the design of the transmission device with two separate pivot arms in connection with the respective coil drives and a spring bias force acting solely on one of the pivot arms involves a comparatively work consuming mounting and thus also increases the production price of the cleaning cassette.

The object of the invention is to provide a cleaning cassette of the type concerned in which the functional advantage of the latter of the above mentioned known designs is maintained concurrently with obtaining a simpler mounting and a more sturdy design of the transmission device, thereby further compensating more easily for productional tolerances in the drive arrangement of the tape recorder.

This is obtained according to the invention in that the transmission device includes a first and a second pinion communicating with respective ones of said hub means, said first pinion being directly connected with a first transmission gear wheel and said second pinion being connected with a second transmission gear wheel via an idle wheel, which first and second transmission gear wheels are mutually independently rotatable about a common axis and which via their respective one-way coupling devices having the same coupling direction are connected with the same shaft pin rotatable about said common axis and carrying the eccentric head.

Figure 2:
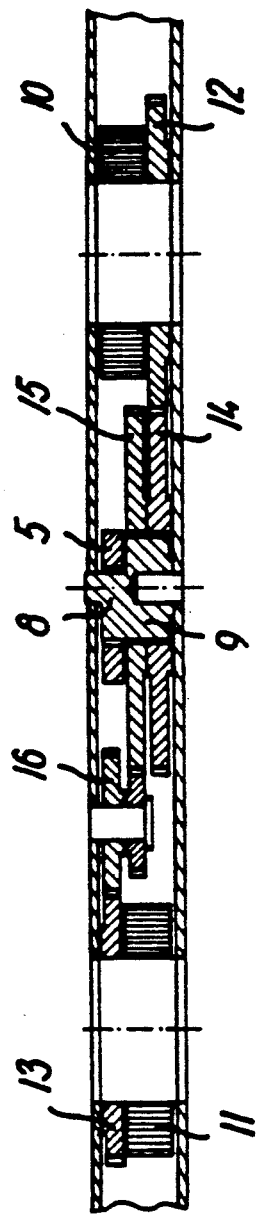
Figure 3:
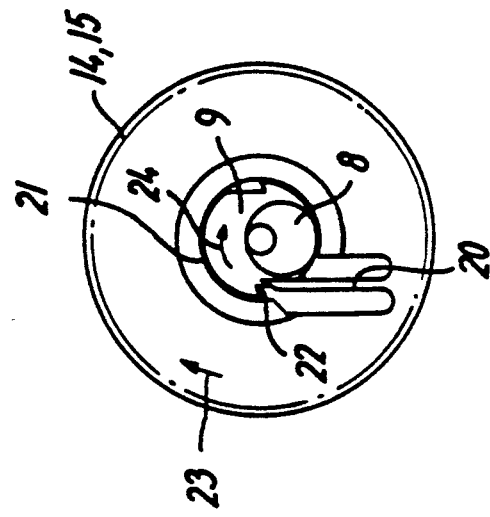

The invention will now be explained in more detail with reference to the accompanying schematical drawings, in which FIG. 1 is a plane view of a cleaning member with an associated transmission device in an embodiment of the cleaning cassette according to the invention, FIG. 2 is a sectional view along the lines II—II in FIG. 1, and FIG. 3 is a one-way coupling between a transmission gear wheel and an eccentric head according to the embodiment in FIG. 1.

In the illustrated embodiment a cleaning member 1 is mounted in a holder 2 which in a manner not shown, e.g. by guide tracks in the cassette walls is controlled to effect reciprocating movement in the cleaning cassette in the direction shown by arrows 3. This movement causes the cleaning member, e.g. formed as a felt pad moistened with cleaning liquid, to effect a sweeping movement across the recording/reproducing head not shown of the tape recorder and on which the cleaning member is kept abutting by a pressure spring 4.

Holder 2 is connected with the free end of a pivot arm, 5 the opposite end of which is pivotally journalled on a pivot pin 6 secured on the cassette. The pivot arm 5 is provided with a slot 7 engaging an eccentric head 8 formed in unison with a shaft pin 9.

For the purpose of engagement with the coil drive shafts, not shown, of the tape recorder the cassette is provided with two hub means 10 and 11 corresponding to the coil drives in a general tape cassette. Pinions 12 and 13 are connected with respective ones of hub means 10 and 11. Pinion 12 is directly connected with a transmission gear wheel 14 while pinion 13 is connected with a transmission gear wheel 15 via an idle wheel 16.

Transmission gear wheel 14 and 15 are superposed to rotate mutually independently about shaft pin 9. Each of the transmission gear wheels 14 and 15 may be interconnected with shaft pin 9 through a one-way coupling which by rotation of the transmission gear wheel in the direction shown by arrow 17 in FIG. 1 connects shaft pin 9 with the transmission gear wheel for rotation in unison.

Irrespective of which of hub means 10 and 11 with associated pinions 12 and 13, resp., is connected with the operative coil drive shaft of the tape recorder when placing the cassette therein, the corresponding transmission gear wheels 14 and 15, resp., and thus also shaft pin 9 with the eccentric head 8 will be made to rotate in the direction shown by arrow 17. This makes pivot arm 5 to effect a reciprocating pivotal movement about pivot pin 6, thereby actuating cleaning member holder 2 to perform the reciprocating sweeping movement illustrated by arrows 3.

The engagement between hub means 10 and the operative coil drive shaft imparts a rotational movement to pinion 12 in the direction shown in arrow 18. The engagement between hub means 11 and the operative coil drive shaft causes pinion 13 to rotate in the direction illustrated by arrow 19, thereby imparting a rotational movement to transmission gear wheel 15 through idle wheel 16 in the direction indicated by arrow 17.

The one-way coupling devices between each of the transmission gear wheels 14 and 15 and shaft pin 9 are designed so that in both cases solely the transmission gear wheel that is in engagement with the pinion engaging the operative coil drive shaft in the tape recorder will be made to rotate, while no co-rotation of the transmission gear wheel that is not connected with an operative coil drive shaft will be effected. Thus, no driving connection through the cleaning cassette is established from hub means 10 to hub means 11, and vice versa.

In respect of each of the transmission gear wheels 14 and 15 the one-way coupling for shaft pin 9 may, as illustrated in FIG. 3, be constituted by a ratchet device comprising a spring pawl 20 formed as an integrated section of the transmission drive wheels 14 and 15, resp., preferably made from injection moulded plastic material, the free end of said spring pawl projecting into the central lead-in opening 21 of shaft pin 9 of the transmission gear wheel, thereby allowing said shaft pin to engage an axially aligned ledge edge 22 of shaft pin 9, thereby providing a co-rotation of shaft pin 9 when the transmission gear wheel rotates in the direction shown by arrow 23.

As regards a transmission gear wheel which does not communicate with an effective coil drive shaft it will appear, however, that the rotation of the shaft pin 9 in the direction illustrated in arrow 24 will not cause any co-rotation of the transmission gear wheel.

The one-way coupling devices between each of the transmission gear wheels 14 and 15 and the shaft pin 9 may, however, also be designed in any other way than illustrated in FIG. 3, e.g. as clamping roller couplings of a design known per se.

We claim:

1. A cleaning cassette for cassette tape recorders comprising a cleaning member which upon placing the cassette in the tape recorder is brought into engagement with a recording/reproducing head and which is subjected to a reciprocating cleaning movement across the recording head by means of a pivot arm one end of which is pivotal about a stationary axis while the other end is connected with the cleaning member, said pivot arm having a slot engaging an eccentric head connected through a transmission device with hub means for engagement with a respective coil drive shaft of the tape recorder in such a manner that the cleaning member by rotation of an operative one of the coil drive shafts of the tape recorder is subjected to said cleaning movement, wherein the transmission device includes a first and a second pinion communicating with respective ones of said hub means, said first pinion being directly connected with a first transmission gear wheel and said second pinion being connected with a second transmission gear wheel via an idle wheel, which first and second transmission gear wheels are mutually independently rotatable about a common axis and which via respectively, a first and second one-way coupling device having the same coupling direction are connected with the same shaft pin rotatable about said common axis and carrying the eccentric head.

2. A cleaning cassette as claimed in claim 1, characterized in that said one-way coupling devices are constituted by ratchet devices each comprising a spring pawl (20) connected with the respective transmission gear wheel (14, 15) and designed to engage an axially aligned ledge edge (22) on the shaft pin for its one direction of rotation (23) without being entrained by the shaft pin (9) upon rotation thereof in the same rotational direction (24).

3. A cleaning cassette for cassette tape recorders, comprising:
   a cassette housing;
   a cleaning member, mounted for reciprocating movement in the housing;
   a pivot arm, pivotably mounted on a stationary axis in the housing, having a free end engaging the cleaning member and a slot formed in the pivot arm;
   an eccentric head rotatably mounted on a shaft pin and engaging the slot in the pivot arm so that rotation of the eccentric head produces pivoting movement of the pivot arm;
   a first transmission device, comprising:
      a first hub, carrying a first pinion, rotatably mounted in the housing for transmitting rotational movement from the cassette recorder;
      a first transmission gear wheel rotatably mounted on the shaft pin and engaging the first pinion;
      a first one-way coupling connected with the eccentric head to rotate the eccentric head and engaging the first transmission wheel in a predetermined direction of rotation;
   a second transmission device, comprising:
      a second hub, carrying a second pinion, rotatably mounted in the housing for transmitting rotational movement from the cassette recorder;
      a second transmission gear wheel rotatably mounted on the shaft pin and engaging the second pinion via an idler gear;
      a second one-way coupling connected with the eccentric head to rotate the eccentric head and engaging the second transmission wheel in the same predetermined direction of rotation as the first one-way coupling;
   wherein the first and second transmission devices are independently capable of rotating the eccentric head with no direct driving connection from the first hub to the second hub.

4. The cleaning cassette as claimed in claim 3, wherein the first and second one-way couplings are ratchet devices comprising a ledge formed on the shaft pin and a first spring pawl connected to the first transmission gear wheel to engage the ledge upon rotation of the first transmission gear wheel in the predetermined direction and a second spring pawl connected to the second transmission gear wheel to engage the ledge upon rotation of the second transmission gear wheel in the predetermined direction.

* * * * *